US012165826B1

(12) United States Patent
Foshage

(10) Patent No.: US 12,165,826 B1
(45) Date of Patent: Dec. 10, 2024

(54) HYBRID HALBACH PERMANENT AND ELECTRO MAGNET ARRAY FOR HARMONIC GYROTRONS

(71) Applicant: RCT Systems, Inc., Baltimore, MD (US)

(72) Inventor: Gerald K. Foshage, Boxford, MA (US)

(73) Assignee: RCT SYSTEMS, INC., Baltimore, MD (US)

( * ) Notice: Subject to any disclaimer, the term of this patent is extended or adjusted under 35 U.S.C. 154(b) by 955 days.

(21) Appl. No.: 17/092,814

(22) Filed: Nov. 9, 2020

Related U.S. Application Data

(60) Provisional application No. 62/932,602, filed on Nov. 8, 2019.

(51) Int. Cl.
*H01J 25/02* (2006.01)
*H01F 7/02* (2006.01)

(52) U.S. Cl.
CPC .......... *H01J 25/025* (2013.01); *H01F 7/0278* (2013.01)

(58) Field of Classification Search
CPC ............................ H01J 25/025; H01F 7/0278
See application file for complete search history.

(56) References Cited

U.S. PATENT DOCUMENTS 6,129,185 A * 10/2000 Osterberg .............. F16F 9/103 188/267.2
6,770,995 B1 * 8/2004 Foshage ................ F16C 39/063 310/90.5
7,061,153 B1 * 6/2006 Foshage .................. H02K 3/47 310/180
9,605,736 B1 * 3/2017 Foshage .............. F16H 37/0826
2006/0208589 A1 * 9/2006 Foshage ................ F16C 32/044 310/90

OTHER PUBLICATIONS

Active Denial Technology, Joint Intermediate Force Capabilities Office, pp. 1-3, May 11, 2020, https://jnlwp.defense.gov/Press-Room/Fact-Sheets/Article-View-Fact-sheets/Article/577989/active-denial-technology/.
Active Denial Technology, Joint Intermediate Force Capabilities Office, pp. 1-3, last downloaded on Nov. 16, 2020, https://jnlwp.defense.gov/Future-Intermediate-Force-Capabilities/Active-Denial-Technology/.

(Continued)

*Primary Examiner* — Shawki S Ismail
*Assistant Examiner* — Lisa N Homza
(74) *Attorney, Agent, or Firm* — MILES & STOCKBRIDGE P.C.

(57) ABSTRACT

A non-cryogenic electro-permanent magnet for use in a gyrotron comprises a plurality of toroidal-shaped sets of electromagnet coils and a plurality of toroidal-shaped permanent magnets, each permanent magnet comprising a plurality of arc segment blocks. Each set of the coils is separated from an adjacent set of the coils by one or more of the permanent magnets disposed between the adjacent sets of coils, such that the coils and the permanent magnets are arranged concentrically to form an open central bore. A combination of magnetic fields in the permanent magnets and magnetic fields in the coils generates a substantially uniform axial magnetic field in the bore.

5 Claims, 20 Drawing Sheets

(56) References Cited

OTHER PUBLICATIONS

Yoshikazu Sakai et al., "High-Strength and High-Conductivity Cu—Ag Alloy Sheets: New Promising Conductor for High-Field Bitter Coils", IEEE Transactions on Magnetics, vol. 30, No. 4, Jul. 1994, pp. 2114-2117.
K. Takahashi et al., "Design of an 8 MW Water-Cooled Magnet for a 35 T Hybrid Magnet at the HFLSM", IEEE Transactions on Applied Superconductivity, vol. 16, No. 2, Jun. 2006, pp. 977-980.
M. Kumada et al., "Development Of 4 Tesla Permanent Magnet", Proceedings of the 2001 Accelerator Conference, Chicago, 2001, pp. 3221-3223.
Larry R. Barnett, "A Compact Normal Magnet for High Power Millimeter-Wave Gyrotrons. The Electromagnet", 2 pages, Published in: 2014 39th International Conference on Infrared, Millimeter, and Terahertz waves (IRMMW-THz) Date of Conference: Sep. 14-19, 2014.

* cited by examiner

HYBRID HALBACH PERMANENT AND ELECTRO MAGNET ARRAY FOR HARMONIC GYROTRONS

PRIORITY INFORMATION

This application claims the benefit of U.S. Provisional Patent Application No. 62/932,602 filed on 8 Nov. 2019, which is incorporated herein by reference in its entirety.

FEDERALLY SPONSORED RESEARCH STATEMENT

The embodiments of the present invention have been made under a United States Marine Corps (USMC) research contract and the government may have certain rights to the subject invention.

BACKGROUND OF THE INVENTION

Field of the Invention

The embodiments of the present invention generally relate to a gyrotron, and more importantly, to a hybrid Halbach permanent and electromagnet array for $2^{nd}$ or other harmonic gyrotrons.

Discussion of the Related Art

In general, a gyrotron is an electromagnetic device that generates high-power, high-frequency (e.g., GHz range or THz) radiation from stimulated cyclotron radiation of electrons oscillating in a strong magnetic field.

FIG. 1 illustrates a schematic of a gyrotron tube according to the related art. For example, FIG. 1 illustrates a schematic for a gyrotron that may be applied to an ADS (Active Denial System).[1]

[1] http://www.bridge12.com/what-is-a-gyrotron/

The gyrotron 100 emits electrons from a cathode 1 in a vacuum 10. The electrons are accelerated by an electric field between the emitter (e.g., cathode 1 or gun 2) and collector (e.g., collector 7) while in the presence of a background magnetic field produced by the main magnet 4 and gun trim magnets 2. As the electron beam 3 travels through the magnetic field and cavity region 5, the electrons gyrate at a specific frequency determined by the local magnetic field. A transverse electromagnetic (TE) mode of the resonator interacts with the gyrating electron beam 3 to produce microwaves at either the cyclotron frequency or harmonics of the cyclotron frequency. A mode converter 6 is used to form a free-Gaussian beam that leaves the gyrotron through a window 8 and is coupled to a waveguide. The spent electron beam is dissipated in the collector 7. The main magnet 4 and gun coil magnets 2 are configured to produce a uniform axial high magnitude magnetic field in the bore.

FIG. 2A illustrates a magnet for use with millimeter-wave gyrotrons according to the related art. For example, FIG. 2A illustrates a 2 tesla (T) "Electropermanent" magnet with 30 mm ID hardware.[2] FIG. 2B illustrates a corresponding magnetic field level map that illustrates magnetism in kilo-Guass (KG) as a function of axial position in millimeters (mm). The magnet depicted in FIG. 2A is the current state of the art, compact, room temperature magnet developed for use with millimeter-wave gyrotrons.

[2] A Compact Normal Magnet for High Power Millimeter-Wave Gyrotrons: The Electropermagnet: Larry R. Barnett Mountain Technology. 420 Red Hill Rd., Normandy, TN 37360 USA

[2] https://nationalmaglab.org/about/maglab-dictionary/bitter-plate

A prototype "electropermagnet" was built and tested to 2.0 T. The prototype has a 30 mm ID bore with a 25 mm flat field cavity region, suitable for efficient fundamental and $2^{nd}$ harmonic mode high power pulse and CW gyrotrons to at least 110 GHZ, and weighs ~22 kg. The gyrotron design that used this magnet is rated for 40 to 100 KW Continuous Wave (CW), using external high power and depressed collectors, at W-band 94 GHz. The "electropermagnet" concept is useful for harmonic cyclotron devices operating at reduced harmonic number for higher efficiency interactions into the sub-millimeter THz range. This compact concept was expected to fill millimeter-wave portable and size restricted gyrotron type applications where superconducting magnet-based systems were not practical. In addition to being small, other advantages of this magnet were reportedly "low fabrication cost, negligible operating and maintenance costs, zero standby power, low operating power, fast turn-on time, and no cool-down time."

The following discuss the general technology area/process available for a main magnet and present limitations.

FIG. 3 illustrates a Bitter magnet constructed with circular conducting metal plates and insulating spacers stacked in a helical pattern according to the related art. In particular, FIG. 3A illustrates a Bitter plate and FIG. 3B illustrates a 40T Bitter Magnet with 40 mm Bore.[3] This design was invented in the 1930s by American physicist Francis Bitter. Electrical current flows in a helical path through the plates generating a solenoid magnetic field with high magnetic field levels in the central bore. The stacked plates are bolted together to withstand outward mechanical pressure produced by Lorentz forces. Cooling water is circulated through holes in the plates to carry away heat resulting from resistive losses ($I^2R$ losses). Recent advancements in cooling and bolt hole geometry have yielded increased efficiency[4]. Copper alloy fabrication and processing enable tailoring of mechanical and electrical properties to specific design optimization[5].

[4] Design of an 8 MW Water-Cooled Magnet for a 35 T Hybrid Magnet at the HFLSM. K. Takahashi, et. al., IEEE Transactions on Applied Superconductivity. Vol. 16. No. 2. June 2006

[5] "High-Strength and High-Conductivity Cu—Ag Alloy Sheets: New Promising Conductor for High-Field Bitter Coils". Yoshikazu Sakai, et. al., IEEE Transactions On Magnetics. Vol. 30, No. 4. July 1994

FIG. 4 illustrates a 4T permanent magnet (PM) assembly (4A) and internal field map (4B) according to the related art. As illustrated, the permanent magnet has a 6 mm ID, 200 mm, OD 150 mm Long and 3.9 Tesla at 23° C. & 4.5 Tesla at −25° C. As illustrated, the NEOMAX PM material is from Sumitomo Special Metal Inc.[6]

[6] Development of 4 Tesla Permanent Magnet. M. Kumada, et. al., Proceedings of the 2001 Particle Accelerator Conference, Chicago FIG. 4 above utilizes a cylindrical Halbach array to achieve high internal field. Halbach array is a configuration of permanent magnets that concentrates magnetic flux on one side of the array and cancels it on the other. This idea was pioneered by Klaus Halbach at Berkeley, who in the late 1970s and early 1980s introduced permanent magnets as "wigglers" and "undulators" to generate synchrotron radiation from a captive high-energy electron beam. The magnetic material of choice was initially a rare-earth/cobalt alloy. Permanent magnets are also used in Fermilab's Antiproton Recycler ring. The key innovation here is to use a saturated iron pole in the magnetic circuit of the permanent magnet to introduce a higher residual field, to compress the magnetic flux, and to weaken the demagnetizing field. Magnetic fields of up to 4.45 Tesla have been attained when cooled to −25° C. (at room temperature the field was 3.9

Tesla). While the field orientation in this device is not axial, the methods and materials are applicable to constructing a PM similar to FIG. 5. FIG. 5: 5 Tesla PM with 6 mm Bore and Internal Field Map[7]

[7] http://cerncourier.com/cws/article/cern/28598

Returning to FIG. 3, a 5 Tesla room temperature PM built by a group of laboratories in Grenoble and is being applied at the Grenoble-based European Synchrotron Radiation Facility (ESRF). The Grenoble magnet is the work of doctoral student Frederic Bloch, who also employed the Halbach Array concept in a spherical geometry. Bloch's device is a 120 mm sphere of rare-earth permanent magnets. Its usable magnetic volume is a 6 mm air gap diameter. The magnet's peak field of 5 T was measured with a gap of 0.15 mm. The compact nature of the magnet meant that it could be inserted into an ESRF beam line in which the maximum field available using electromagnets had previously been 2.5 T.

As stated above, FIG. 2 illustrates a compact, room temperature magnet developed specifically for use with millimeter-wave gyrotrons. A prototype "electropermagnet" was built and tested to 2.0 T. The prototype has a 30 mm ID bore with a 25 mm flat field cavity region, suitable for efficient fundamental and $2^{nd}$ harmonic mode high power pulse and CW gyrotrons to at least 110 GHZ, and weighs ~22 kg. The gyrotron design that used this magnet is rated for 40 to 100 KW Continuous Wave (CW), using external high power and depressed collectors, at W-band 94 GHz. The "electropermagnet" concept is useful for harmonic cyclotron devices operating at reduced harmonic number for higher efficiency interactions into the sub-millimeter THz range. This compact concept was expected to fill millimeter-wave portable and size restricted gyrotron type applications where superconducting magnet-based systems were not practical. In addition to being small, other advantages of this magnet were reportedly low fabrication cost, negligible operating and maintenance costs, zero standby power, low operating power, fast turn-on time, and no cool-down time.

FIG. 6 illustrates another high field coil technology that may be applicable to a high current coil solution. Vibration test equipment use very high current density armature windings that are constructed with tubing for direct, chilled liquid, cooling; Aluminum tubing is used for low mass. Of course, the current source and cooling equipment must be sized for a practical application. However, this mature technology has proven to be quite durable and practical. While not superconducting, the resistive losses may be reduced significantly by operating the coil at low temperatures to reduce conductor resistivity. Cooling channels in cold plates adjacent to coil conductors may also be employed to remove heat. FIG. 6 is a High Current Density, Two Layer Helical Shaker Armature Coil Using Liquid Cooled, Aluminum Rectangular Tube Conductor[8]

[8] http://www.cvmsl.co.uk/armature-rewinds.php & http://dodsontech.com/index.php/dodsontech-armatures/

FIG. 7 illustrates a YBCO Superconductor Coils for a 34 mm Bore, 32 Tesla Magnet[9] FIG. 7 illustrates two high temperature superconducting materials (YBCO) being wound for use in an all cryogenic high field magnet. While "high temperature" is defined as the boiling point of Liquid Nitrogen, these coils are operated well below that temperature to insure operation is well below the critical temperature, critical current density, and critical magnetic field, so the superconducting properties are not lost. These magnets require significant Dewar infrastructure, cryogenic coolant flow, and cool down time for operation.

[9] https://nationalmaglab.org/magnet-development/magnet-science-technology/magnet-projects/32-tesla-scm None of these technologies currently meet the needs for a non-cryogenic, $2^{nd}$ harmonic gyrotron magnet. The all-PM solutions have a bore diameter that is an order of magnitude too small. The superconducting coils require large cryostats and long cool down times prior to operation. The state of the art "electropermagnet" has not satisfied the need for a non-cryogenic, large bore diameter with high magnitude and uniform magnetic field.

SUMMARY OF THE INVENTION

Accordingly, the present invention is directed to a hybrid Halbach permanent and electromagnet array for $2^{nd}$ or other harmonic gyrotrons that substantially obviates one or more problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

According to the embodiments of the invention, a non-cryogenic electro-permanent magnet for use in a gyrotron comprises a plurality of toroidal-shaped sets of electromagnet coils and a plurality of toroidal-shaped permanent magnets, each permanent magnet comprising a plurality of arc segment blocks. Each set of the coils is separated from an adjacent set of the coils by one or more of the permanent magnets disposed between the adjacent sets of coils, such that the coils and the permanent magnets are arranged concentrically to form an open central bore. A combination of magnetic fields in the permanent magnets and magnetic fields in the coils generates a substantially uniform axial magnetic field in the bore.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Figure 1:
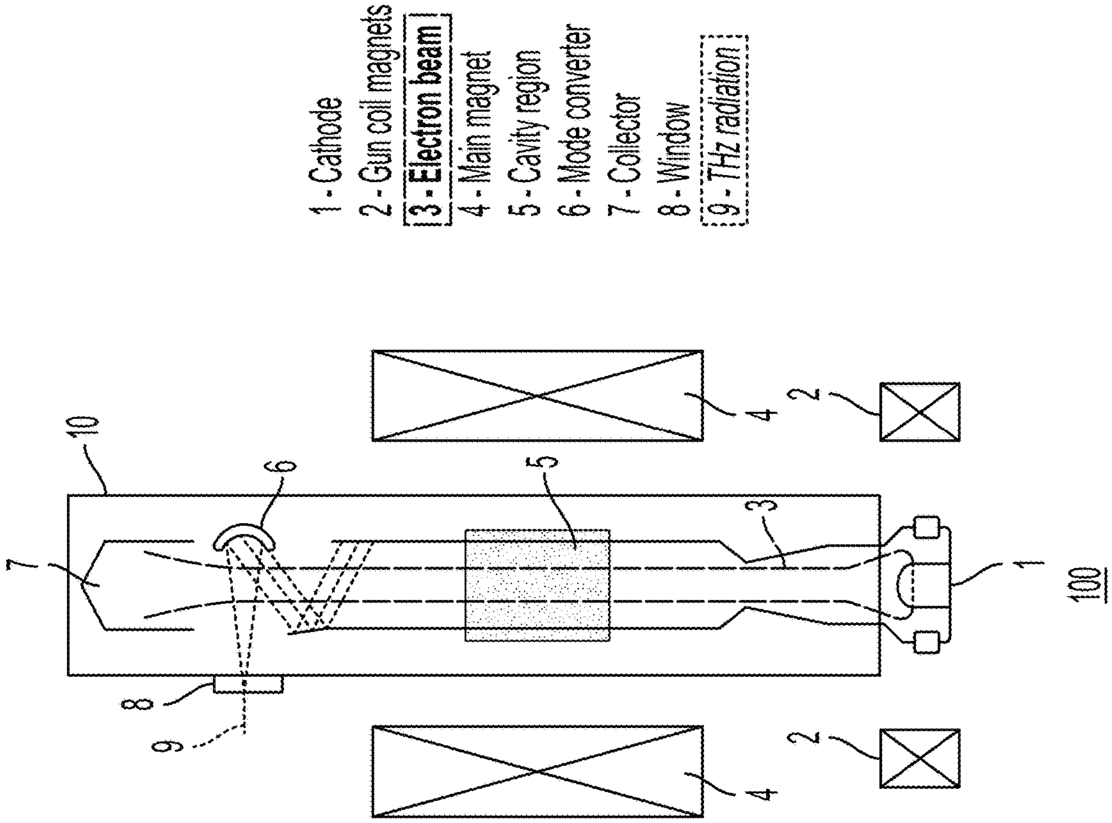
FIG. 1 schematically illustrates a gyrotron usable with the disclosed magnet assembly.
Figure 2B:
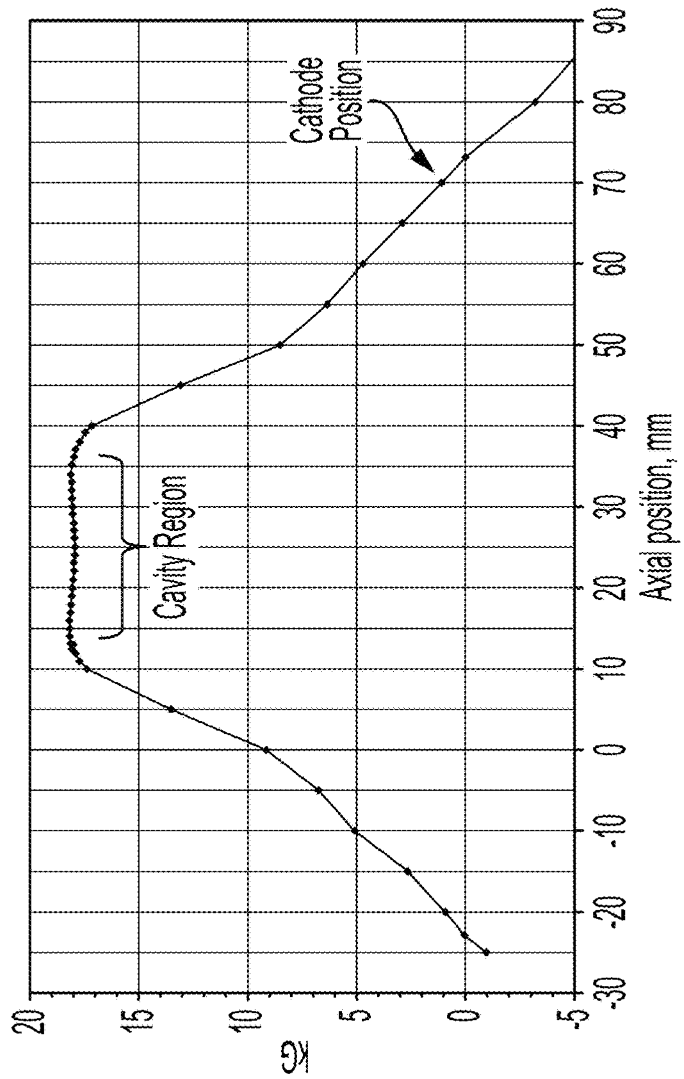
FIGS. 2-7 illustrate conventional gyrotron magnets according to the related art.
Figure 2A:
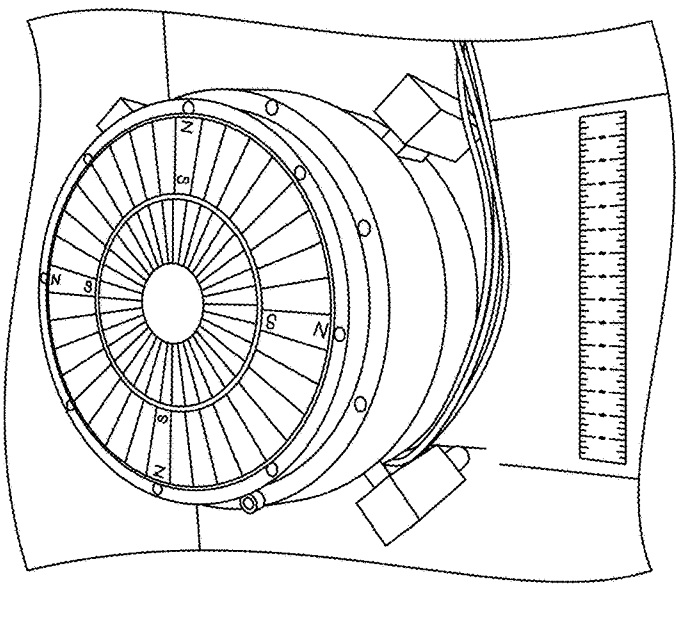
Figure 3B:
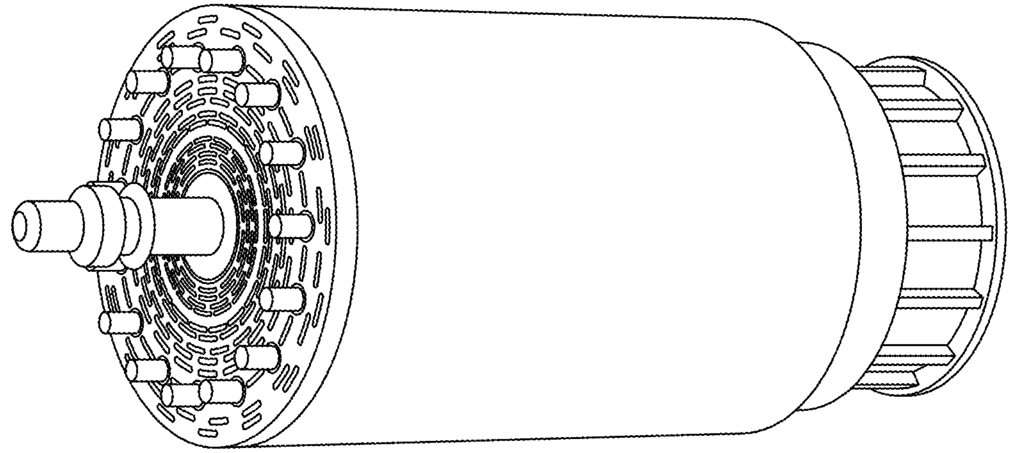
Figure 3A:
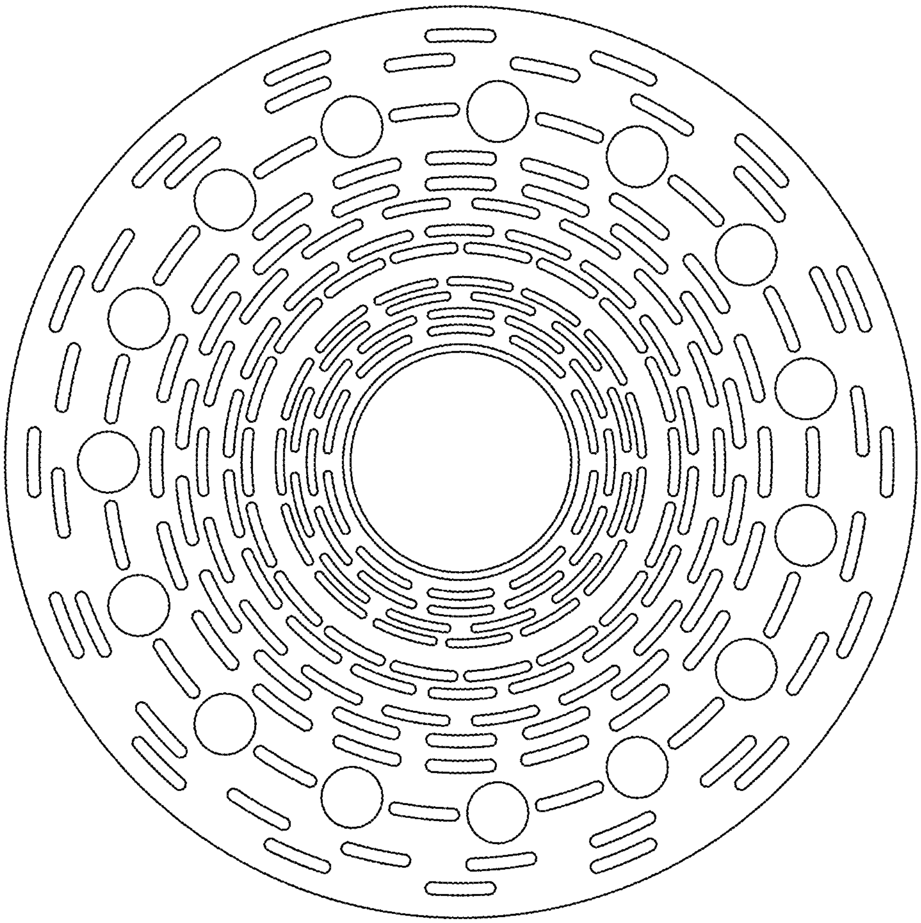
Figure 4B:
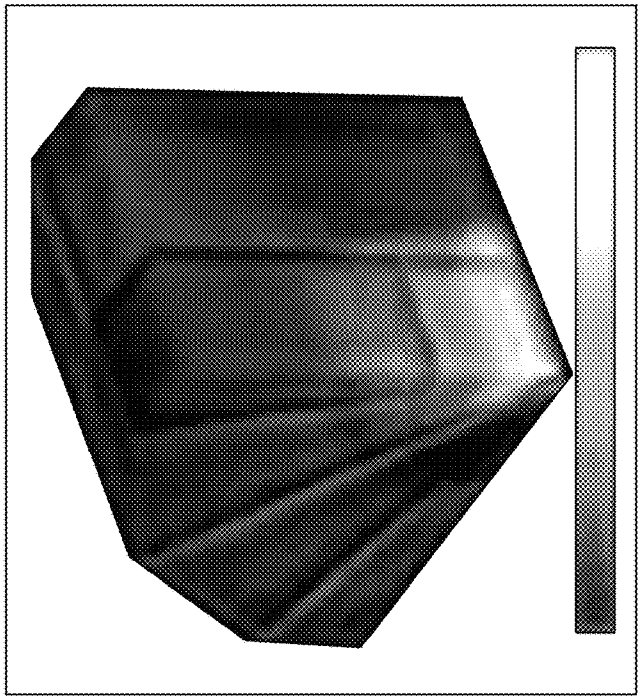
Figure 4A:
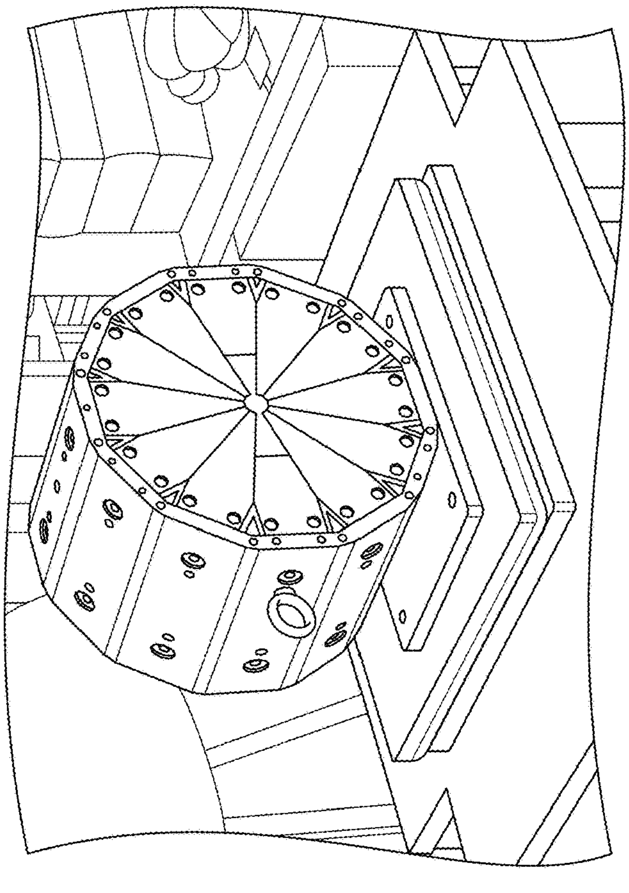
Figure 5B:
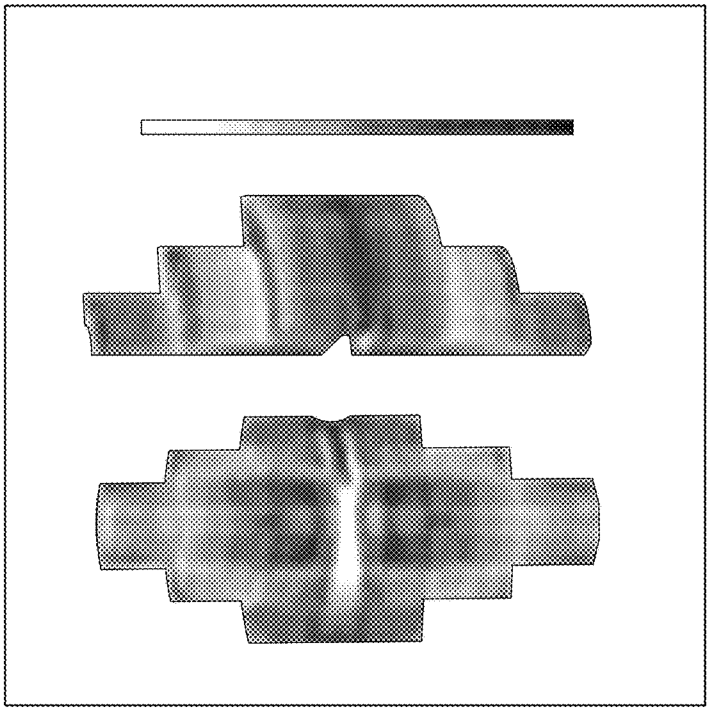
Figure 5A:
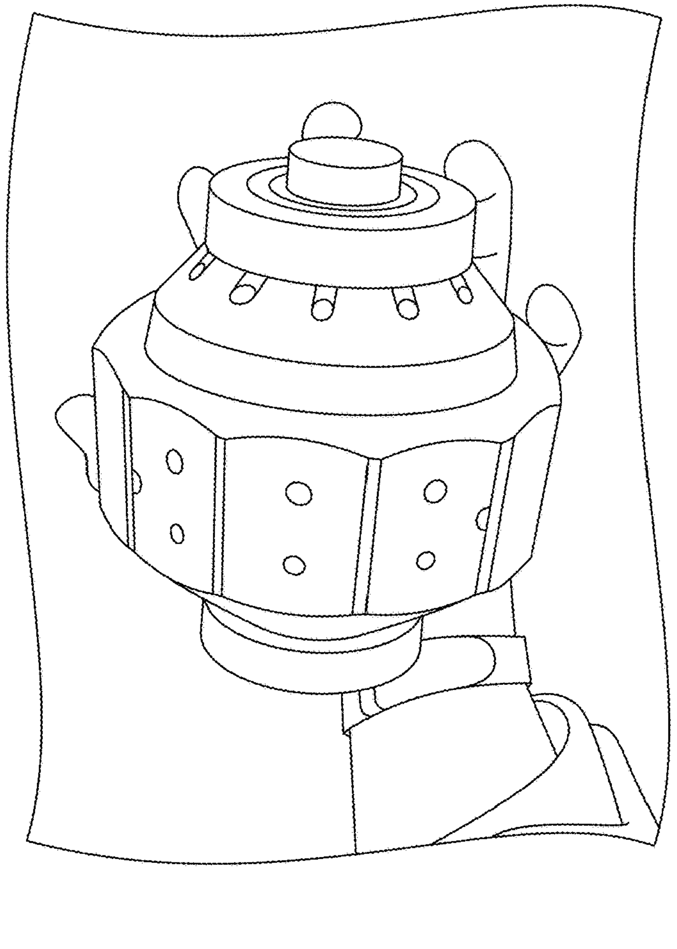
Figure 6B:
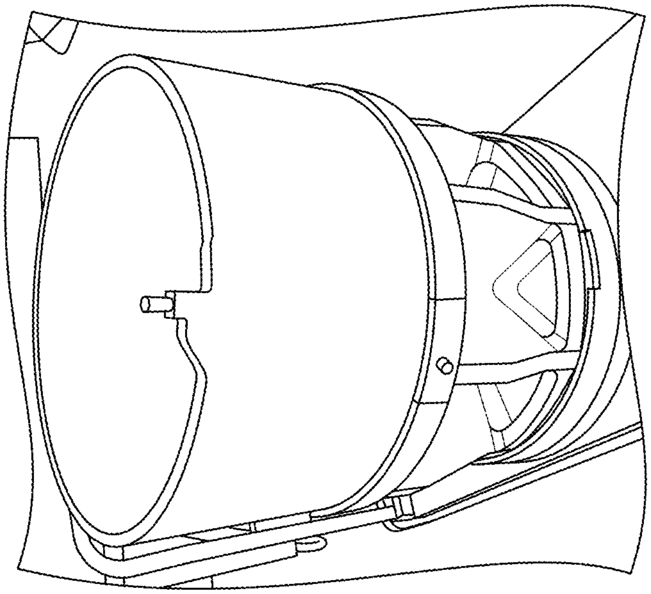
Figure 6A:
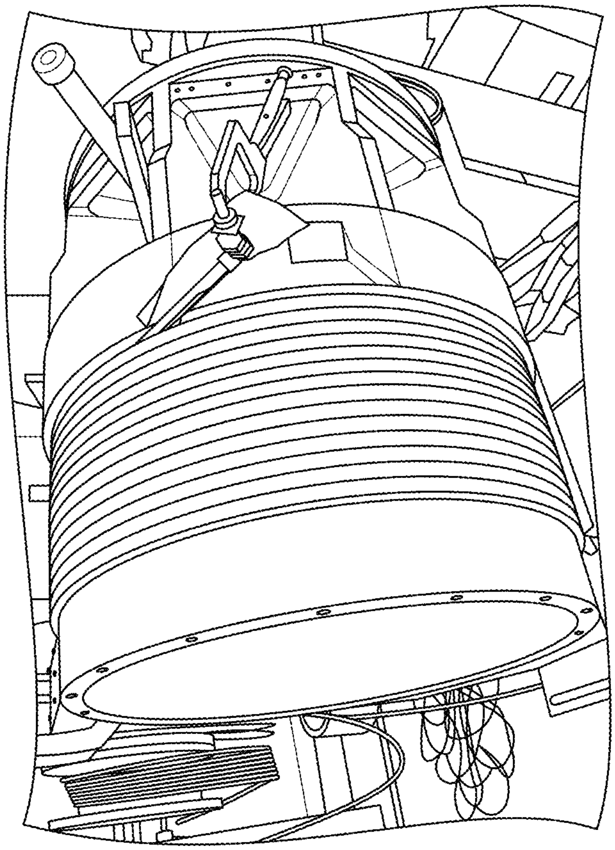
Figure 7B:
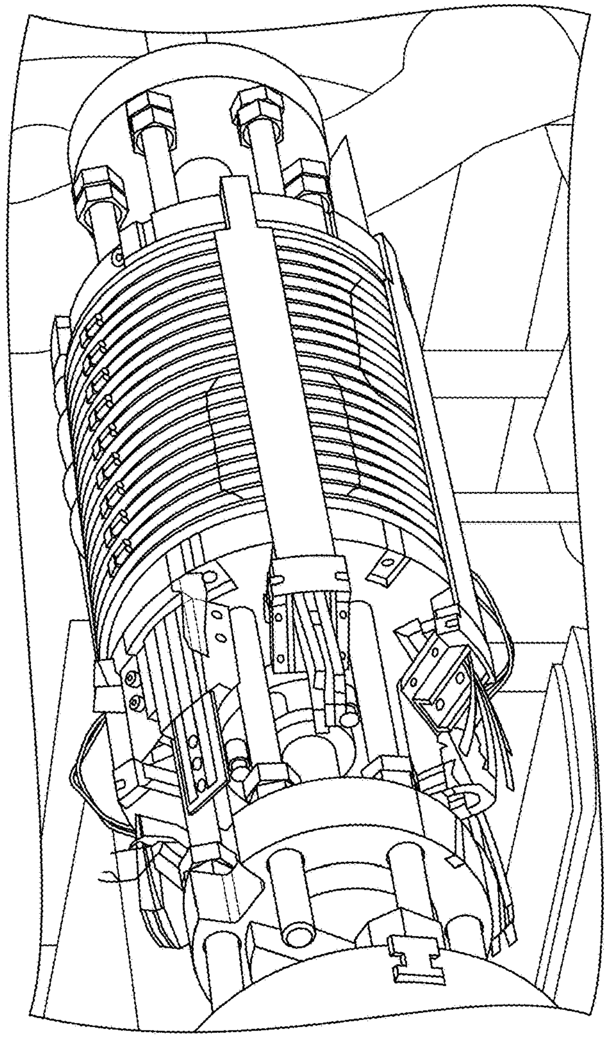
Figure 7A:
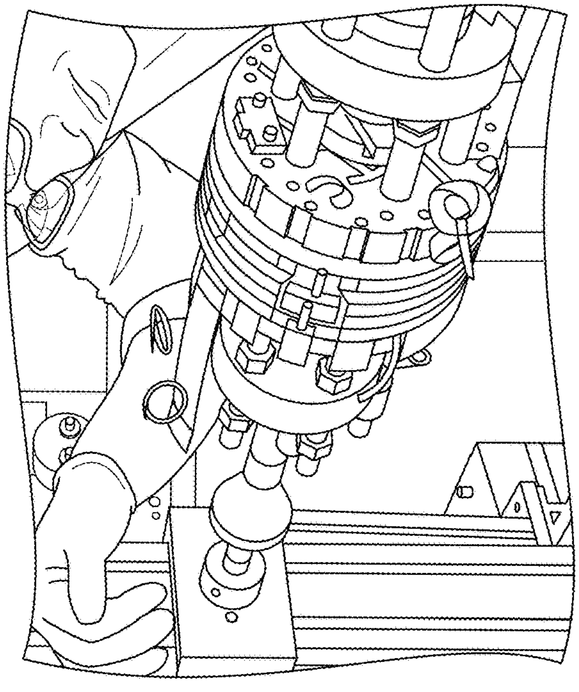

Reference will now be made in detail to the embodiments of the present invention, examples of which are illustrated in the accompanying drawings. Wherever possible, like reference numbers will be used for like elements. It should be understood that the principles described herein are not limited in application to the details of construction or the arrangement of components set forth in the following description or illustrated in the drawings. The principles may be embodied in other embodiments and may be practiced or carried out in various ways. Also, it is to be understood that the phraseology and terminology used herein is for the purpose of description and should not be regarded as limiting.

According to the embodiments of the invention, a non-cryogenic electro-permanent magnet for use in a gyrotron comprises a plurality of toroidal-shaped sets of electromagnet coils and a plurality of toroidal-shaped permanent magnets, each permanent magnet comprising a plurality of arc segment blocks. Each set of the coils is separated from an adjacent set of the coils by one or more of the permanent magnets disposed between the adjacent sets of coils, such that the coils and the permanent magnets are arranged concentrically to form an open central bore. A combination of magnetic fields in the permanent magnets and magnetic fields in the coils generates a substantially uniform axial magnetic field in the bore.

In further embodiments, one of the permanent magnets surrounds a set of the coils, and one of the permanent magnets surrounds the one or more permanent magnets between adjacent sets of the coils. In other embodiments, a ferromagnetic band surrounds the surrounding permanent magnets. In still further embodiments, a ferromagnetic band surrounds one or more of the sets of the coils.

The magnet assemblies described herein provides a uniform axial magnetic field in a cylindrical volume from the superposition of magnetic fields from a modified, permanent magnet Halbach array, and a plurality of coiled, current carrying, conductors. The bore diameter and volume, field magnitude and field uniformity are suitable for application in 2$^{nd}$ or other harmonic gyrotrons. The magnet assemblies described herein comprise an assembly of a plurality of similar permanent magnet segments into rings. Plural rings are assembled, each having various magnetization vector orientations suitably arranged to create a uniform, predominantly axial magnetic field in a cylindrical bore volume. Multi-turn coiled current carrying conductors are located inside and outside of the permanent magnet rings with appropriate current magnitude and direction to reinforce and shape a magnetic field strength and uniformity in the cylindrical volume.

Active fluid cooling may be employed inside the conductors and/or external to the conductors to control the hybrid magnet temperature and electrical properties.

The use of a modified cylindrical Halbach Array enables higher magnetic field levels than that obtained by the existing art, and enables the elimination of ferromagnetic materials in the magnet if desired.

Also disclosed herein is a non-cryogenic gyrotron main magnet that uses an all-permanent-magnet structure (i.e., no ferromagnetic material) and a multi-coil configuration.

Figure 8:
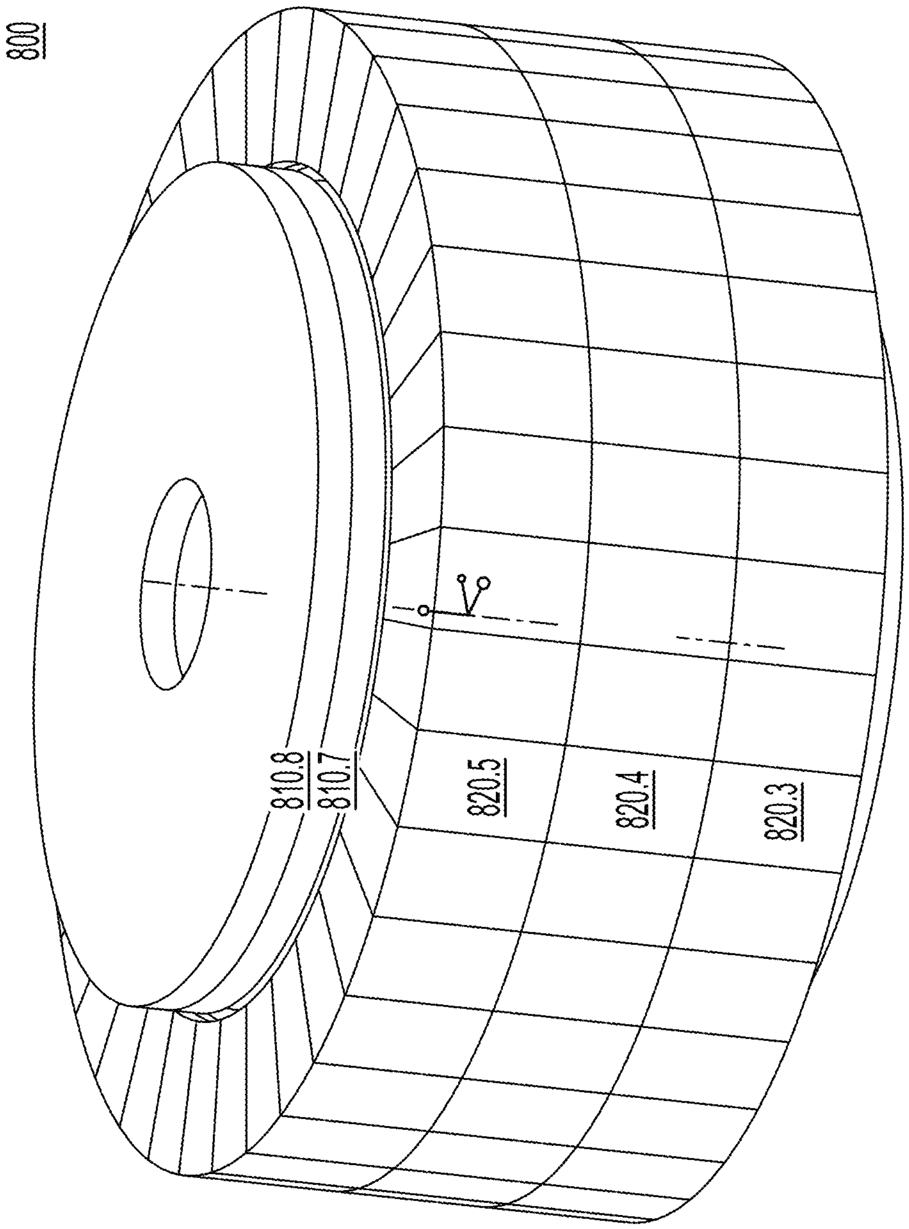
FIG. 8 illustrates an exterior perspective view of an electro-permanent magnet according to a first example embodiment of the present invention.
Figure 9:
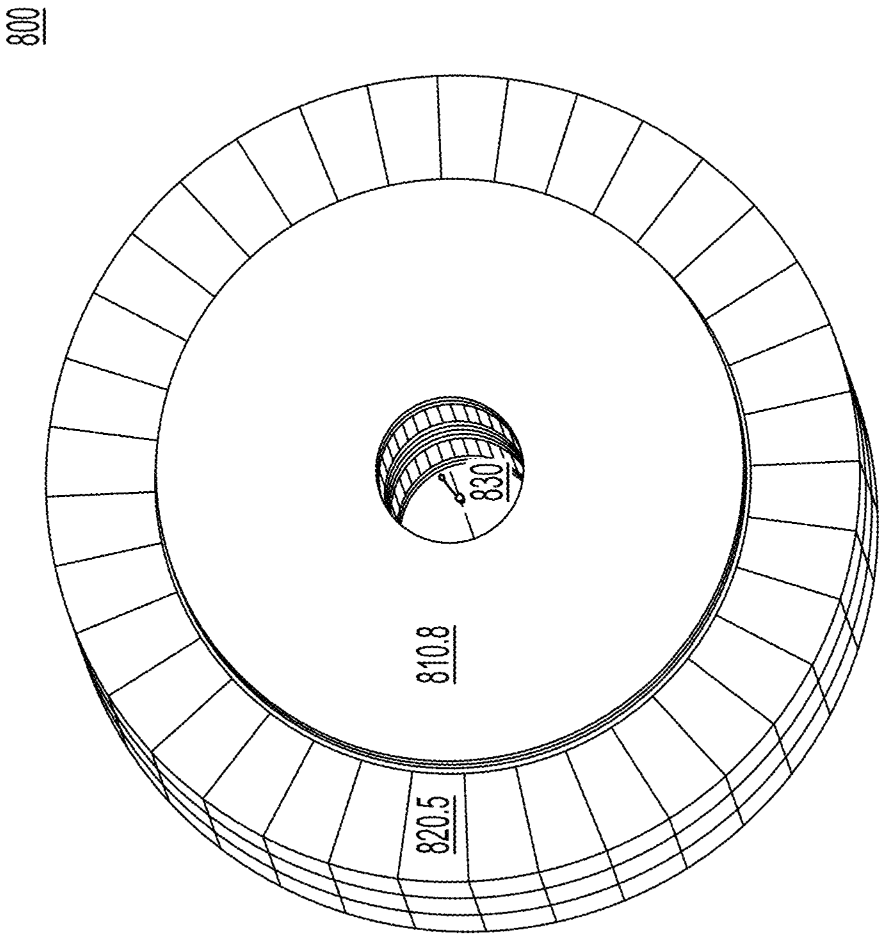
FIG. 9 illustrates an exterior bore view of the electro-permanent magnet according to the first example embodiment of the present invention.
Figure 10:
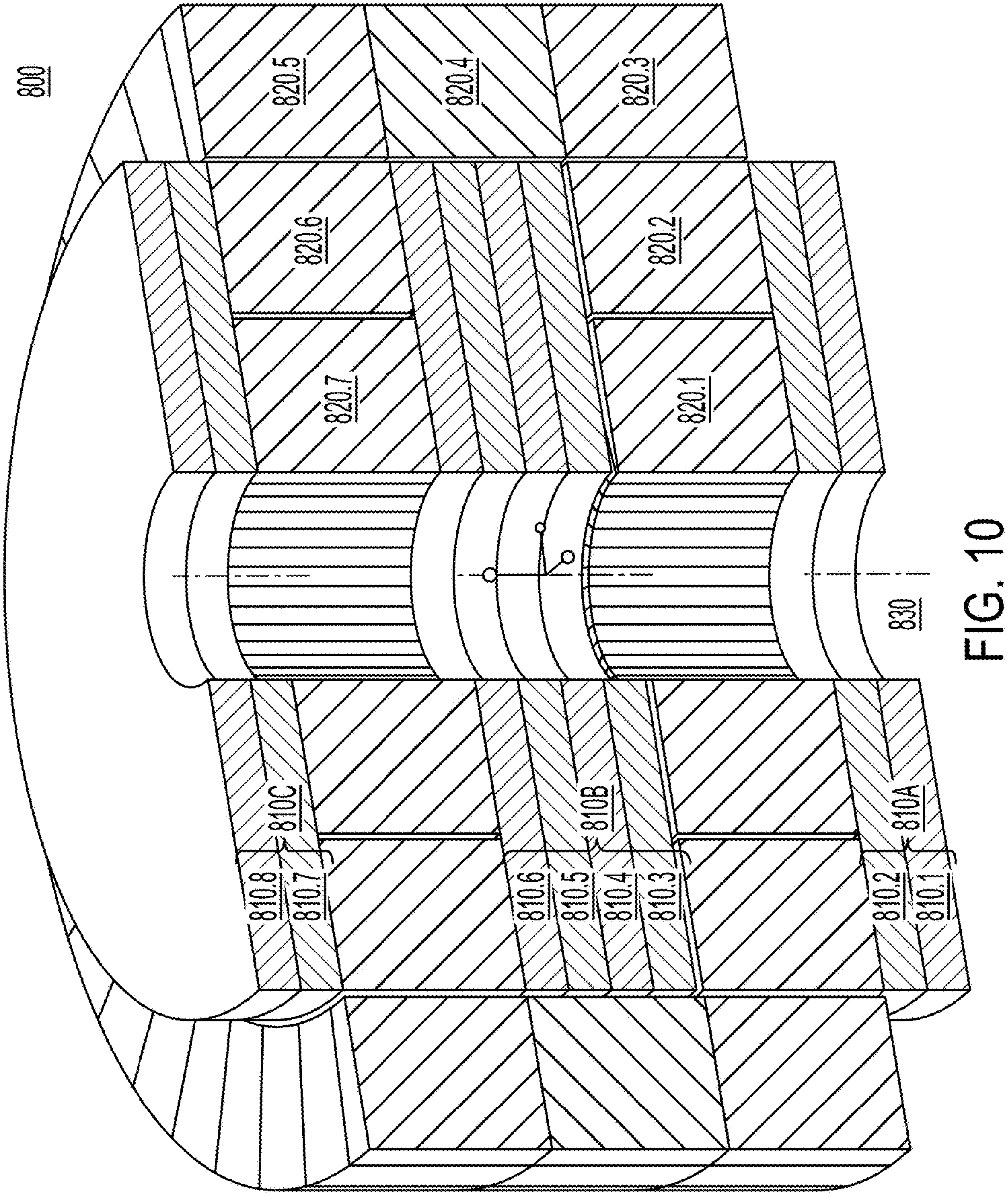
FIG. 10 illustrates a cross-sectional view of the electro-permanent magnet according to the first example embodiment of the present invention.

FIG. 8 illustrates an exterior perspective view of an electro-permanent magnet (EPM) assembly 800 according to a first example embodiment of the present invention. FIG. 9 illustrates an exterior bore view of the EPM assembly 800 according to the first example embodiment of the present invention. FIG. 10 illustrates a cross-sectional view of the EPM assembly 800 according to the first example embodiment of the present invention.

As illustrated in each of FIG. 8, FIG. 9, and FIG. 10, the EPM assembly 800 includes a plurality of coils 810.1, 810.2, 810.3, 810.4, 810.5, 810.6, 810.7, 810.8, the plurality of coils 810.1-810.8 being arranged in plural sets of coils 810A, 810B, and 810C. As further illustrated in FIG. 8, FIG. 9, and FIG. 10, the EPM assembly 800 comprises an array of permanent magnet (PM) rings 820.1, 820.2, 820.3, 820.4, 820.5, 820.6, 820.7.

The plurality of coils 810.1-810.8 are electro-magnet coils (e.g., a toroid, loop, helix, or spiral) and may be composed of a copper coil or other conductive material (e.g., aluminum, silver, gold, etc.) and/or may be tape wound. In some instances, one or more cooling plates (not illustrated) may be disposed between the plurality of coils 810.1-810.8. In addition, and in an example configuration, each of the plurality of coils 810.1-810.8 may be configured at a 9 inch outer diameter, at a height of 0.26 inch, and assembled with 0.08 inch tall, interleaved, micro-channel, cooling plates (not illustrated) having the same 9 inch outer diameter.

Each of the PM rings 820.1-820.7 may be constructed with a plurality of arc segment blocks. Permanent magnets may include high energy product, rare earth magnet materials such as Samarium Cobalt and/or Neodymium Iron Boron alloys. Each of the PM rings 820.1-820.7, or segments thereof, may be magnetized using known techniques.

FIG. 9 illustrates the bore region 830 of the EPM assembly 800. EPM assembly 800 is configured to provide a maximum and uniform magnetic field within bore region 830. In an example configuration, the bore region 830 may have a diameter of approximately 2 inches or 50 mm. In this example configuration, and in connection with the 2 inch bore diameter, the outer diameter (OD) of the magnet ring is 8.3 inches, and the height is 1.5 inches.

FIG. 10 illustrates a cross-section of the EPM assembly 800 which includes three (3) sets of coils 810A, 810B, and 810C (individual turns not illustrated), and an array of seven (7) PM magnet rings 820.1-820.7. This configuration is exemplary, and the embodiments of the invention are not so limited.

In the first embodiment, there are three coil sub-assemblies illustrated; two outboard and one inboard of the PM assembly. In addition, the PM assembly includes seven (7) ring subassemblies, illustrated with 36 magnet segments per ring. Here, there are only three unique segment geometries used in the assembly. It should be noted that the first embodiment is exemplary, and the embodiments of the invention are not so limited.

Figure 11:
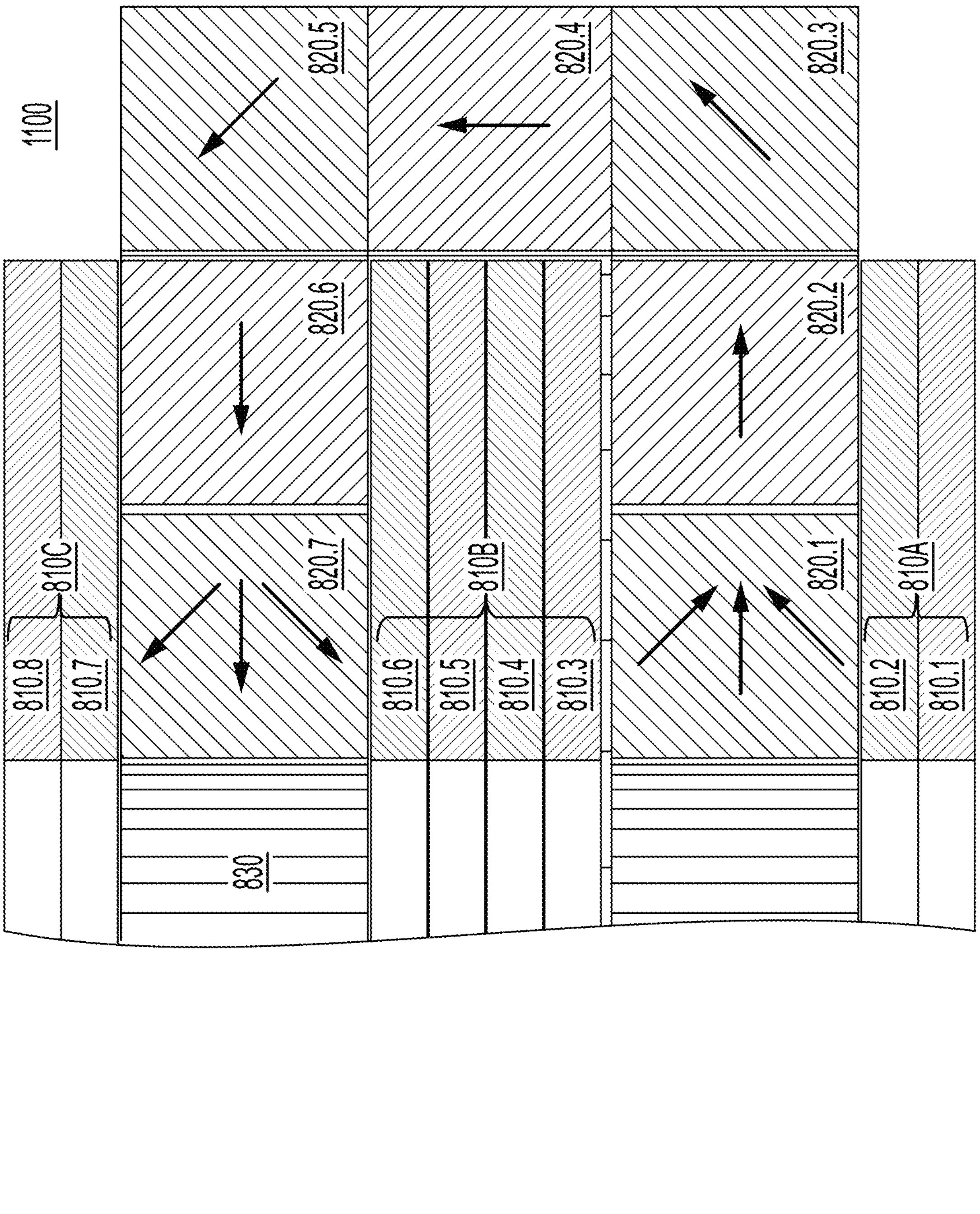
FIG. 11 illustrates a magnetization vector map of the permanent magnet rings according to the first example embodiment of the present invention.
Figure 12:
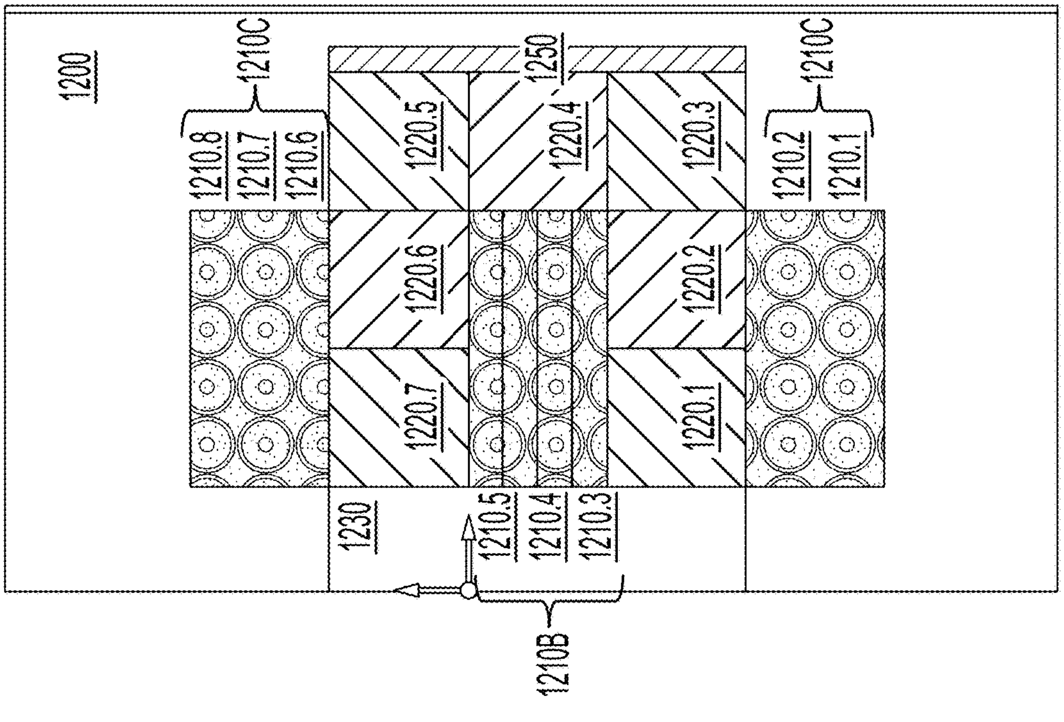
FIG. 12 illustrates a cross-sectional view of electro-permanent magnet assembly according to a second example embodiment of the present invention.

FIG. 11 illustrates a magnetization vector map 1100 of the PM rings 820.1-820.7 according to the first example embodiment of the present invention. As illustrated in FIG. 11, the magnetization vectors of the PM rings 820.1-820.7 vary in a counterclockwise direction (or alternatively, a clockwise direction depending on point of reference) beginning at PM ring 820.1 and proceeding through the remaining PM rings 820.2-820.7. Each of 820.1 and 820.7, the two rings adjacent to the EPM bore region 830, depict multiple vectors to illustrate that the angle of the magnetic field may be varied in the design process to optimize the bore field level and uniformity in conjunction with the fields produced by the current in the plurality of coils 810.1-810.8. Similarly, the angle of the magnetic field for each of PM rings 820.1-820.2 may be varied in the design process to optimize the bore field level and uniformity. The magnetic fields of the PM rings 820.1-820.7 superimpose to generate an axial B field in the bore region 830. Combined with the B fields produced by the coils, a large, uniform, axial magnetic field results in the bore region 830 with much lower current and power than may be obtained with only coils. In addition, the example configuration and magnetization of PM rings 820.1-820.7 and the plurality of coils 810.1-810.8 do not require use of ferromagnetic materials (e.g., ferromagnetic band 1250, as shown in FIG. 12) to function. However, configurations with ferromagnetic material may be configured to modify the magnetic fields and/or provide shielding of the external magnetic fields.

FIG. 11 further illustrates the orientation of the magnetization vectors of the PM segments of the magnet assembly of FIGS. 8-10 to create a toroidal Halbach array. Each of the segments in a ring have the same magnetization orientation. The two, inner most, rings show 3 different vectors illustrating how deviation from the classic Halbach orientation (arrows pointing inboard) may be used to shape the bore region field.

FIG. 12 illustrates a cross-sectional view of EPM assembly 1200 according to a second example embodiment of the present invention.

As illustrated in each of FIG. 12, the EPM assembly 1200 includes a plurality of coils 1210.1-1210.8, the plurality of coils 1210.1-1210.8 being arranged in plural sets of coils 1210A, 1210B, and 1210C. As further illustrated in FIG. 12, the EPM assembly 1200 comprises an array of permanent magnet (PM) rings 1220.1-1220.7. PM rings 1220.3, 1220.4, and 1220.5 are disposed adjacent to casing 1250 (e.g., a ferromagnetic band on the outer diameter), which may be constructed of a ferromagnetic material to modify the magnetic fields and/or provide shielding of the external magnetic fields.

The plurality of coils 1210.1-1210.8 are electro-magnet coils (e.g., a toroid, loop, helix, or spiral) and may be constructed of a copper coil or other conductive material (e.g., aluminum, silver, gold, etc.) and/or may be tape wound. In some instances, one or more cooling plates (not illustrated) may be disposed between the plurality of coils 1210.1-1210.8. In addition, and in an example configuration, the plurality of coils 1210.1-1210.8 may be configured at a 9 inch outer diameter, at a height of 0.26 inch, and assembled with 0.08 inch tall, interleaved, micro-channel, cooling plates (not illustrated) having the same 9 inch outer diameter.

Each of the PM rings 1220.1-1220.7 may be constructed with a plurality of arc segment blocks. Permanent magnets may include high energy product, rare earth magnet materials such as Samarium Cobalt and/or Neodymium Iron Boron alloys. Each of the PM rings 1220.1-1220.7, or segments thereof, may be magnetized using known techniques.

Figure 13:
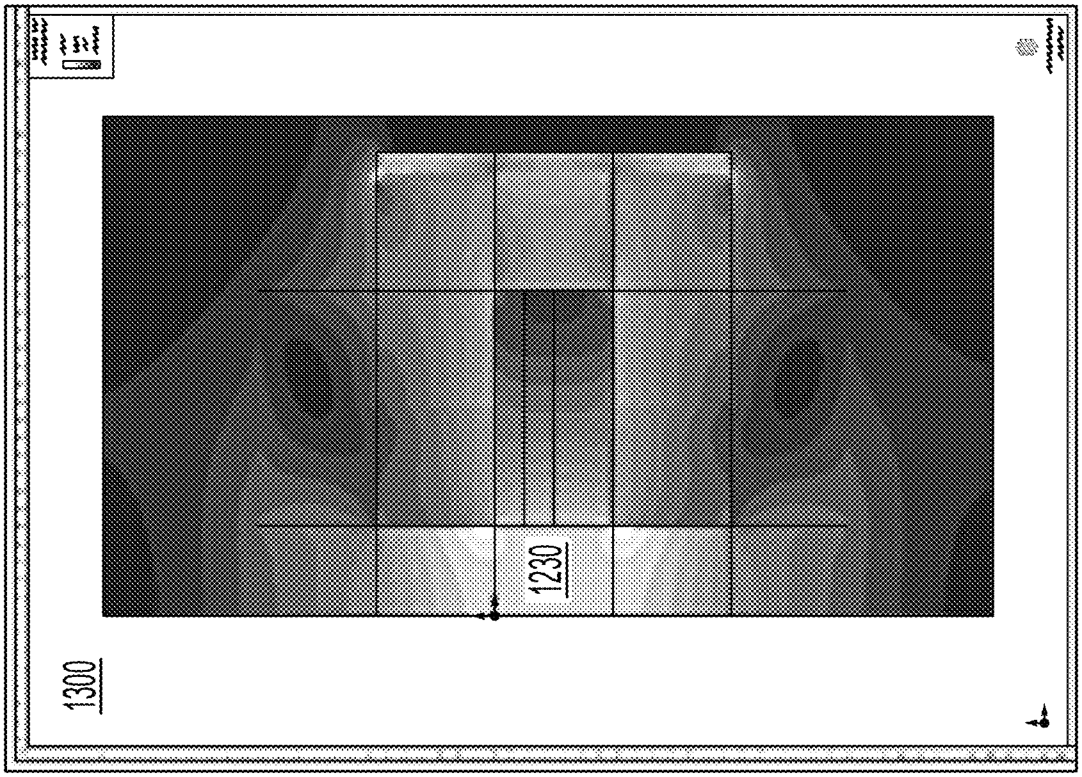
FIG. 13 illustrates a finite element analysis B field map according to the second example embodiment of the present invention.

FIG. 13 illustrates a finite element analysis (FEA) B field map 1300 according to the second example embodiment of the present invention. FIG. 13 illustrates the resulting magnetic field distribution and magnitude for a set of PM properties, magnetization vectors, number of coils, turns and currents selected to yield a maximum magnitude and uniformity of the B field in the bore region 1230.

Figure 14:
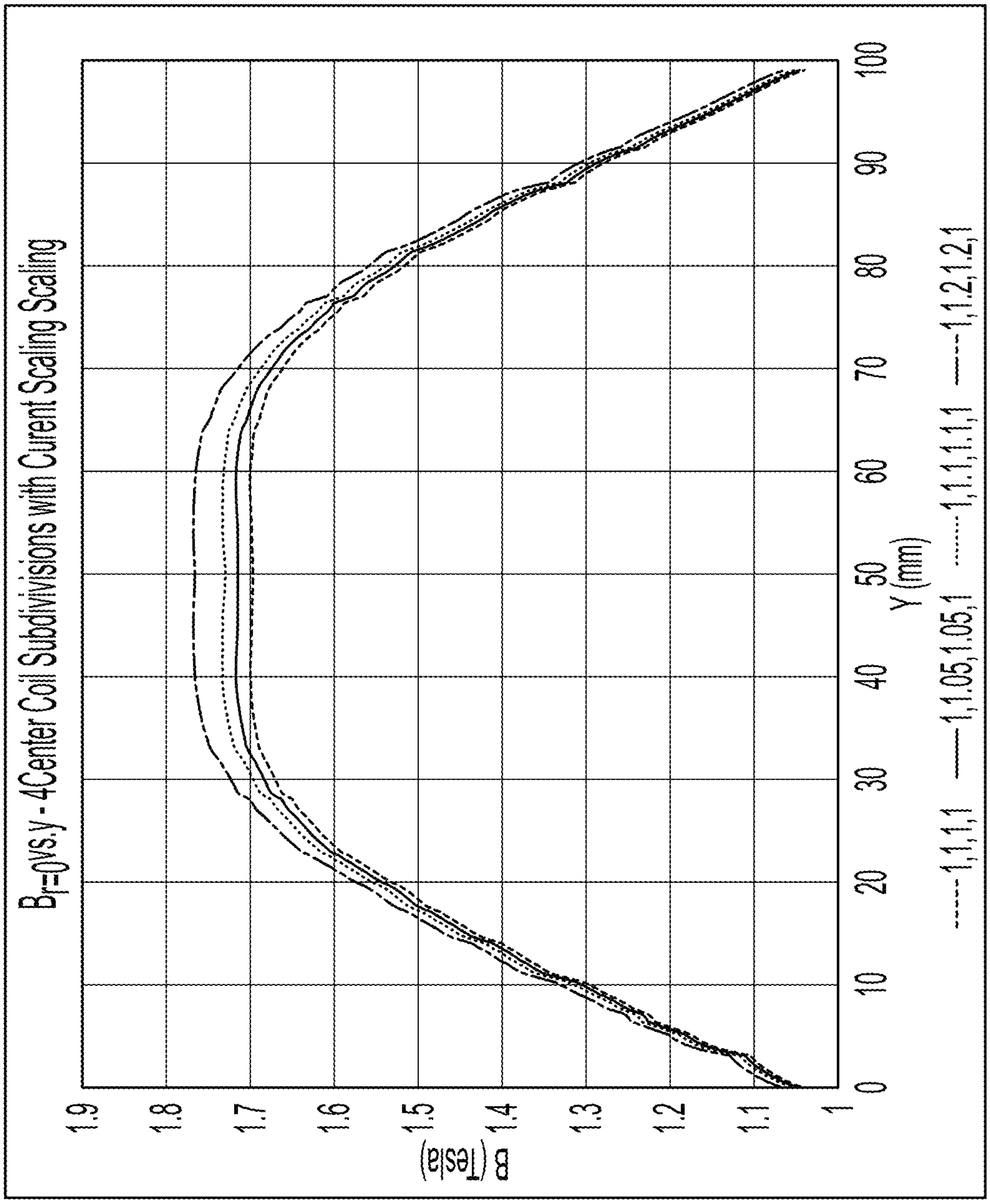
FIG. 14 illustrates a graph of the B field on the centerline of the bore region versus axial position for several different coil currents according to the second example embodiment of the present invention.

FIG. 14 illustrates a graph of the B field on the centerline of the bore region versus axial position for several different coil currents according to the second example embodiment of the present invention. As shown, the B field is maximum and uniform in the bore region 1230, between 30 and 70 mm (i.e., a cavity or active region having a maximum and uniform magnetic field), at approximately 1.7 T using different current configurations in the plurality of coils.

FIG. 15 illustrates a cross-sectional view of the EPM assembly 1500 according to third and fourth example embodiments of the present invention.

Figure 15B:
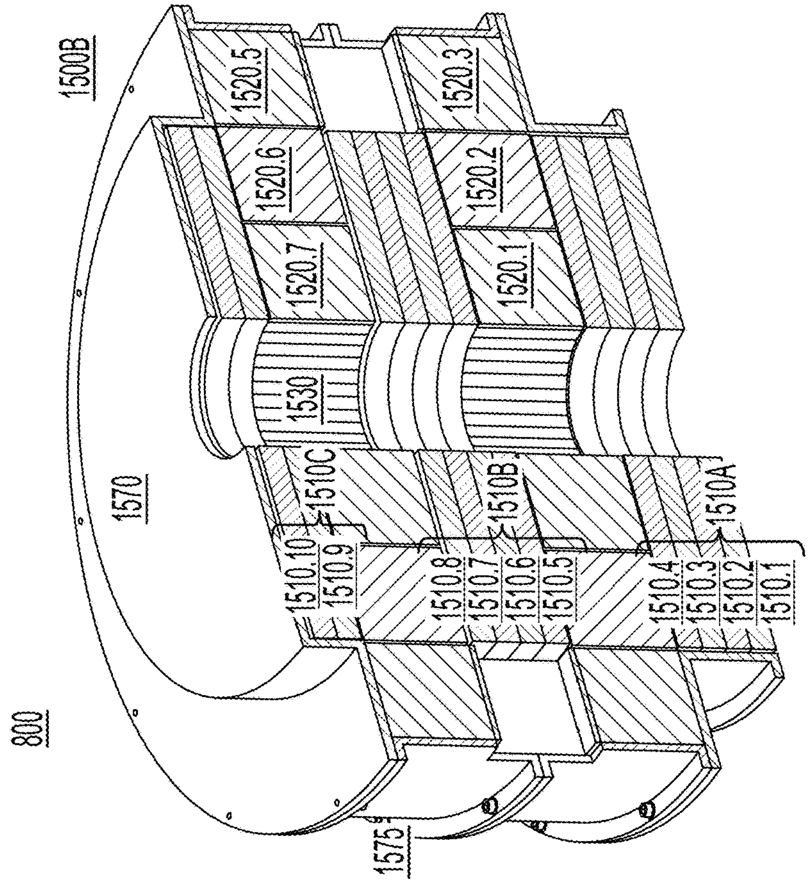
FIG. 15 illustrates a cross-sectional view of the electro-permanent magnet assembly according to third and fourth example embodiments of the present invention.
Figure 15A:
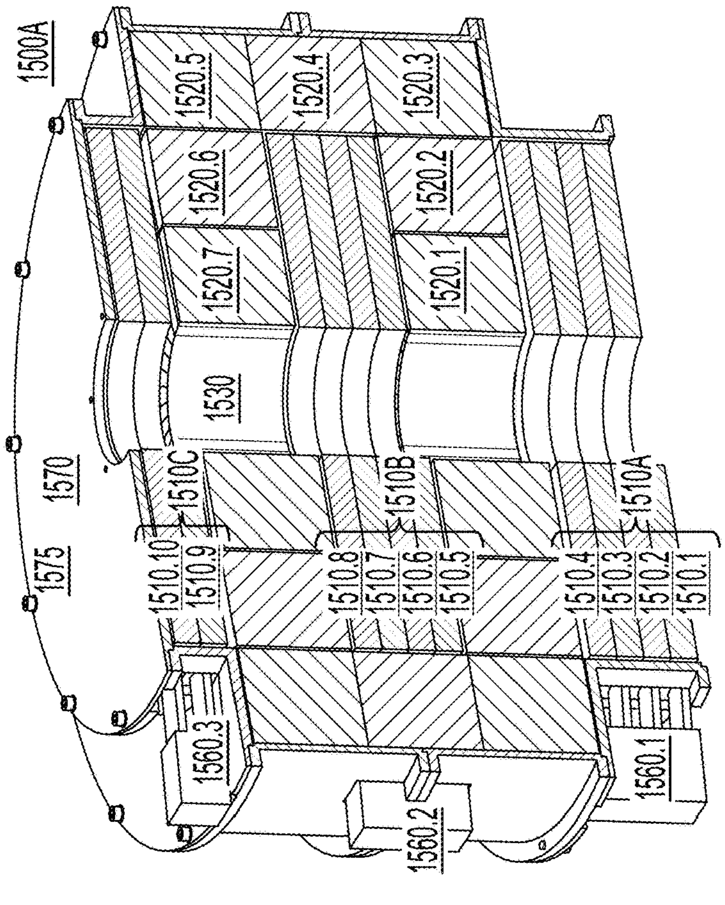

As illustrated in each of FIGS. 15A and 15B, each of the EPM assemblies 1500A and 1500B includes a plurality of coils 1510.1-1510.10, the plurality of coils 1510.1-1510.10 being arranged in plural sets of coils 1510A, 1510B, and 1510C. As further illustrated in FIG. 15, each of the EPM assemblies 1500A and 1500B comprises an array of permanent magnet (PM) rings 1520.1-1520.7 (portions of 1520.4 being omitted in the configuration illustrated in FIG. 15B). PM Rings 1520.1-1520.7 and plurality of coils 1510.1-1510.10 being enclosed in casing 1570.

The plurality of coils 1510.1-1510.10 are electro-magnet coils (e.g., a toroid, loop, helix, or spiral) and may be constructed of a copper coil or other conductive material (e.g., aluminum, silver, gold, etc.) and/or may be tape wound. One or more cooling plates (not illustrated) are disposed between the plurality of coils 1510.1-1510.10. Cooling liquid may be supplied to the cooling plates using one or more cooling manifolds. For example, cooling manifolds 1560.1, 1560.2, and 1560.3 may be functionally coupled to each set of coils 1510A, 1510B, 1510C, respectively.

Each of the PM rings 1520.1-1520.7 may be constructed with a plurality of arc segment blocks. Permanent magnets may include high energy product, rare earth magnet materials such as Samarium Cobalt and/or Neodymium Iron Boron alloys. Each of the PM rings 1520.1-1520.7, or segments thereof, may be magnetized using known techniques.

The structural material of casing 1570 may be non-ferromagnetic in this embodiment. Alternatively, a ferromagnetic casing or band on the outer diameter may be used to modify the magnetic fields and/or provide shielding of the external magnetic fields. Casing 1570 may be structurally enforced using a plurality connectors 1575 (e.g., bolts or screws).

Each of FIGS. 15A and 15B illustrates cross-sections of EPM assembly 1500A and 1500B, respectively. In FIG. 15B, EPM assembly 1500B enables access to the center coil set 1510B to facilitate electrical connections, and the ingress and egress of coolant by leaving one or more magnet segments of 1520.4 out of the magnet array.

Figure 16:
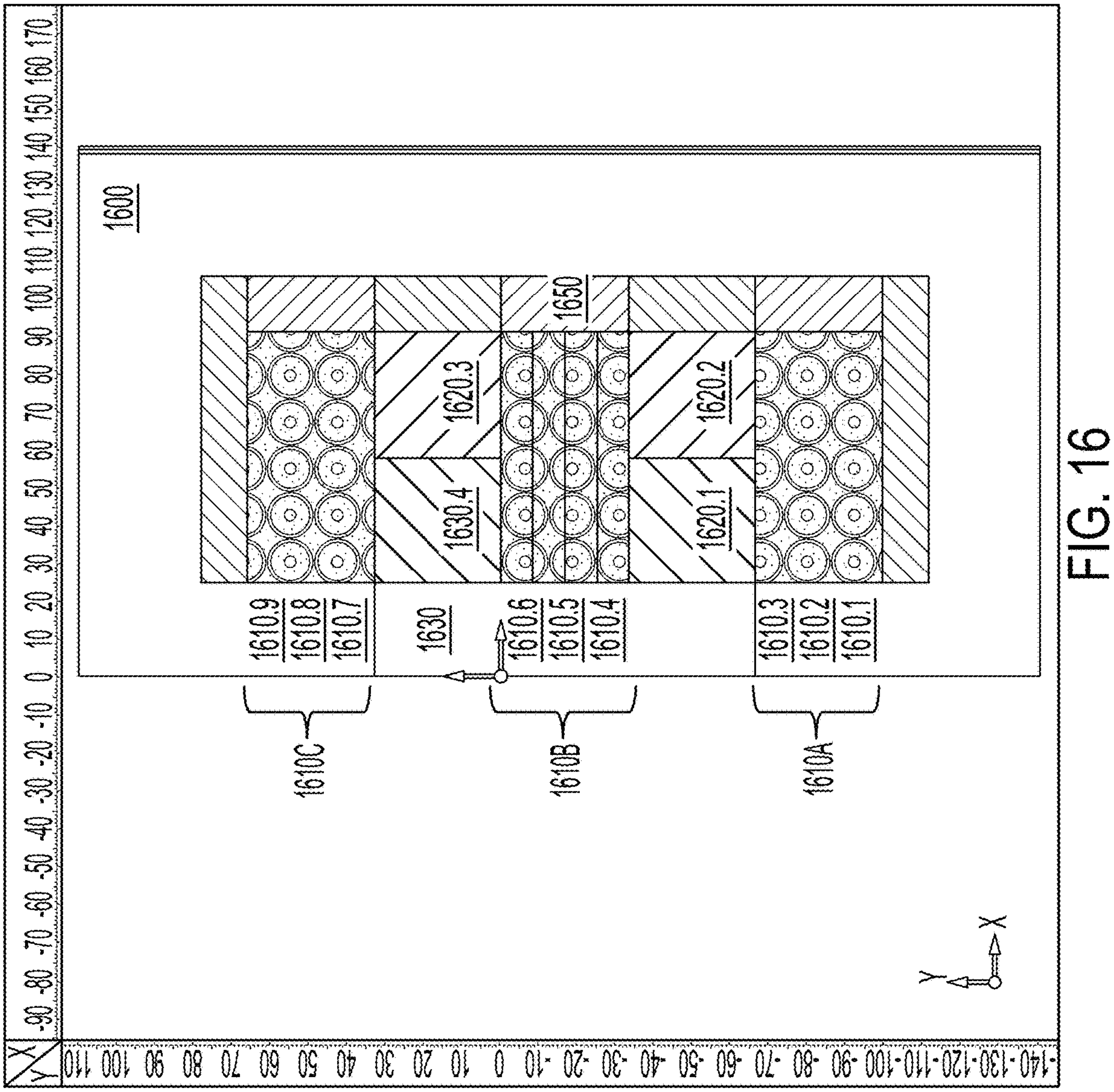
FIG. 16 illustrates a cross-sectional view of the electro-permanent magnet assembly according to fifth example embodiment of the present invention.

FIG. 16 illustrates a cross-sectional view of the EPM 1600 according to fifth example embodiment of the present invention.

As illustrated in each of FIG. 16, the EPM 1600 includes a plurality of coils 1610.1-1610.9, the plurality of coils 1610.1-1610.9 being arranged in plural sets of coils 1610A, 1610B, and 1610C. As further illustrated in FIG. 16, the EPM assembly 1600 comprises an array of permanent magnet (PM) rings 1620.1-1620.4.

The plurality of coils 1610.1-1610.9 are electro-magnet coils (e.g., a toroid, loop, helix, or spiral) and may be constructed of a copper coil or other conductive material (e.g., aluminum, silver, gold, etc.) and/or may be tape wound. In some instances, one or more cooling plates (not illustrated) may be disposed between the plurality of coils 1610.1-1610.9.

Each of the PM rings 1620.1-1620.4 may be constructed with a plurality of arc segment blocks. Permanent magnets may include high energy product, rare earth magnet materials such as Samarium Cobalt and/or Neodymium Iron Boron alloys. Each of the PM rings 1620.1-1620.4, or segments thereof, may be magnetized using known techniques.

The plurality of coils 1610.1-1610.9 and the plurality of permanent magnet (PM) rings 1620.1-1620.4 may enclosed within casing 1650 (e.g., a ferromagnetic material or band on the outer surface or outer diameter), which may be constructed of a ferromagnetic material to modify the magnetic fields and/or provide shielding of the external magnetic fields.

In this embodiment, EPM assembly 1600 uses a thick radial cross section ring of ferromagnetic material 1650 as a low reluctance return path for the magnetic field in place of the three outermost rings of permanent magnets. Two optional ferromagnetic end plates are included in this design, but one or both may be omitted.

Figure 17:
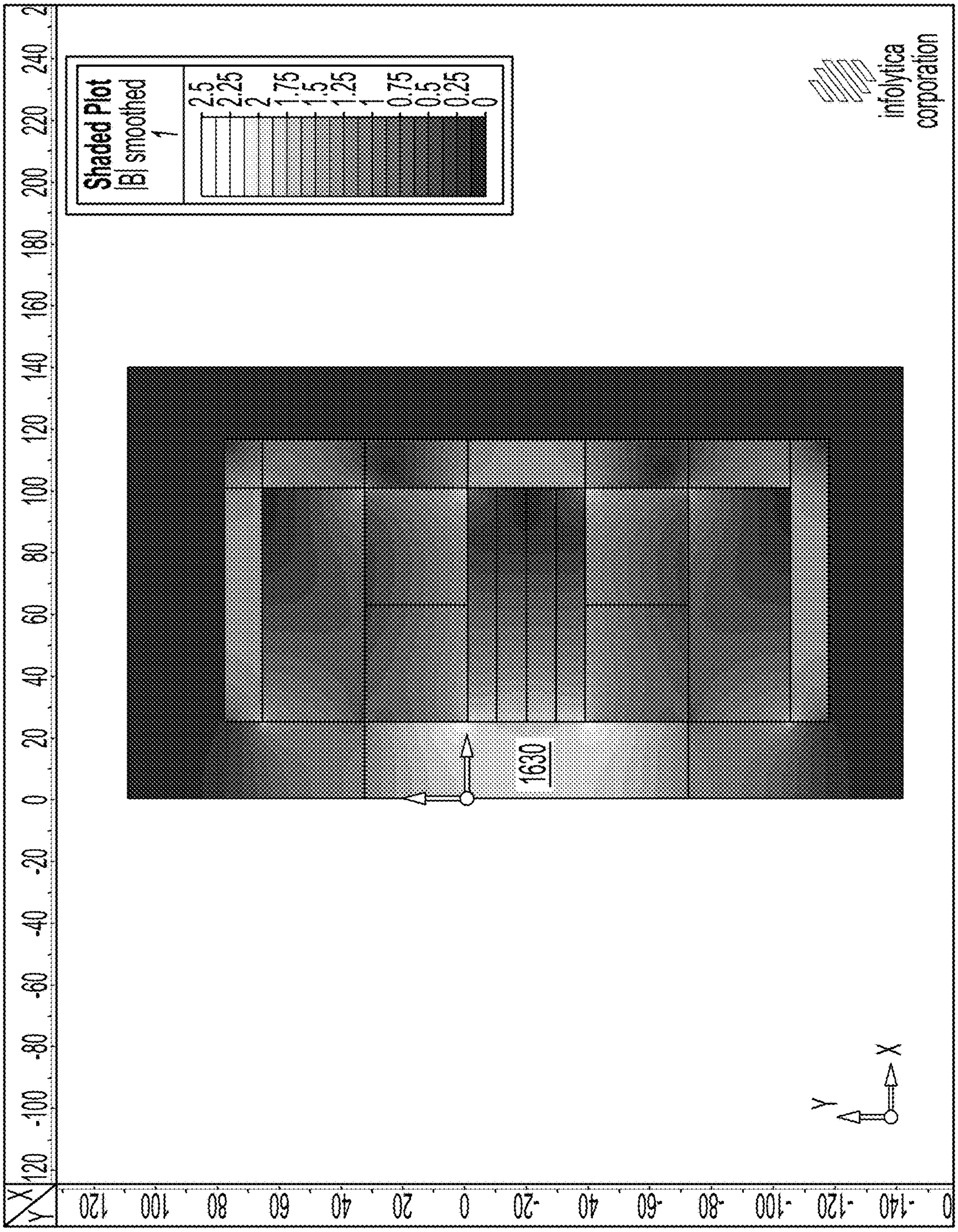
FIG. 17 illustrates a finite element analysis B field map according to the fifth example embodiment of the present invention.

FIG. 17 illustrates a finite element analysis (FEA) B field map 1700 according to the fifth example embodiment of the present invention. FIG. 17 illustrates the resulting magnetic field distribution and magnitude for a set of PM properties, magnetization vectors, number of coils, turns and currents selected to yield a maximum magnitude and uniformity of the B field in the bore region 1630.

Figure 18:
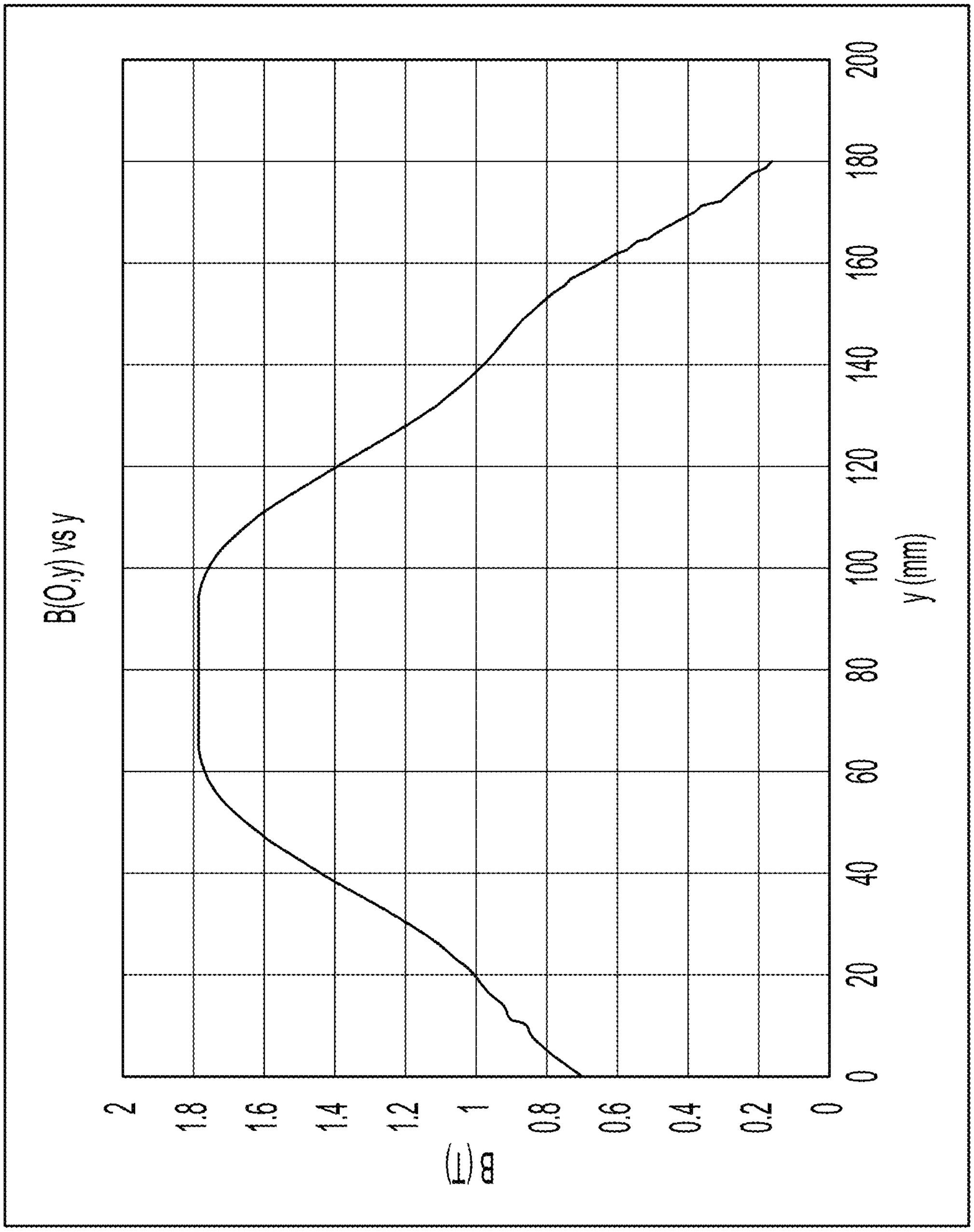
FIG. 18 illustrates a graph of the B field on the centerline of the bore region versus axial position for according to the fifth example embodiment of the present invention.

FIG. 18 illustrates a graph of the B field on the centerline of the bore region 1630 versus axial position for according to the fifth example embodiment of the present invention. As shown, the B field is maximum and uniform in the bore region 1630, between 60 and 100 mm i.e., a cavity or active region having a maximum and uniform magnetic field), at approximately 1.8 T.

FIG. 18 plots the axial magnetic field versus the bore center axial position. This configuration has a uniform field as the result of suitable selection of coil N*I (number of turns times current in amperes) and permanent magnet vector orientations. The magnet field vectors in the two concentric rings of magnets may have different radial and axial vector components. The top and bottom rings have complementary magnetizations that superimpose with the field from the top rings and the coil fields yielding a high magnitude, uniform bore field. Geometry, material and component temperature trades (e.g., magnet energy product, conductor density and conductivity, ferromagnetic permeability and density, coolant temperature, etc.) enable scaling of the size of the uniform bore field along with selection of the hardware weight and coil power.

Figure 19:
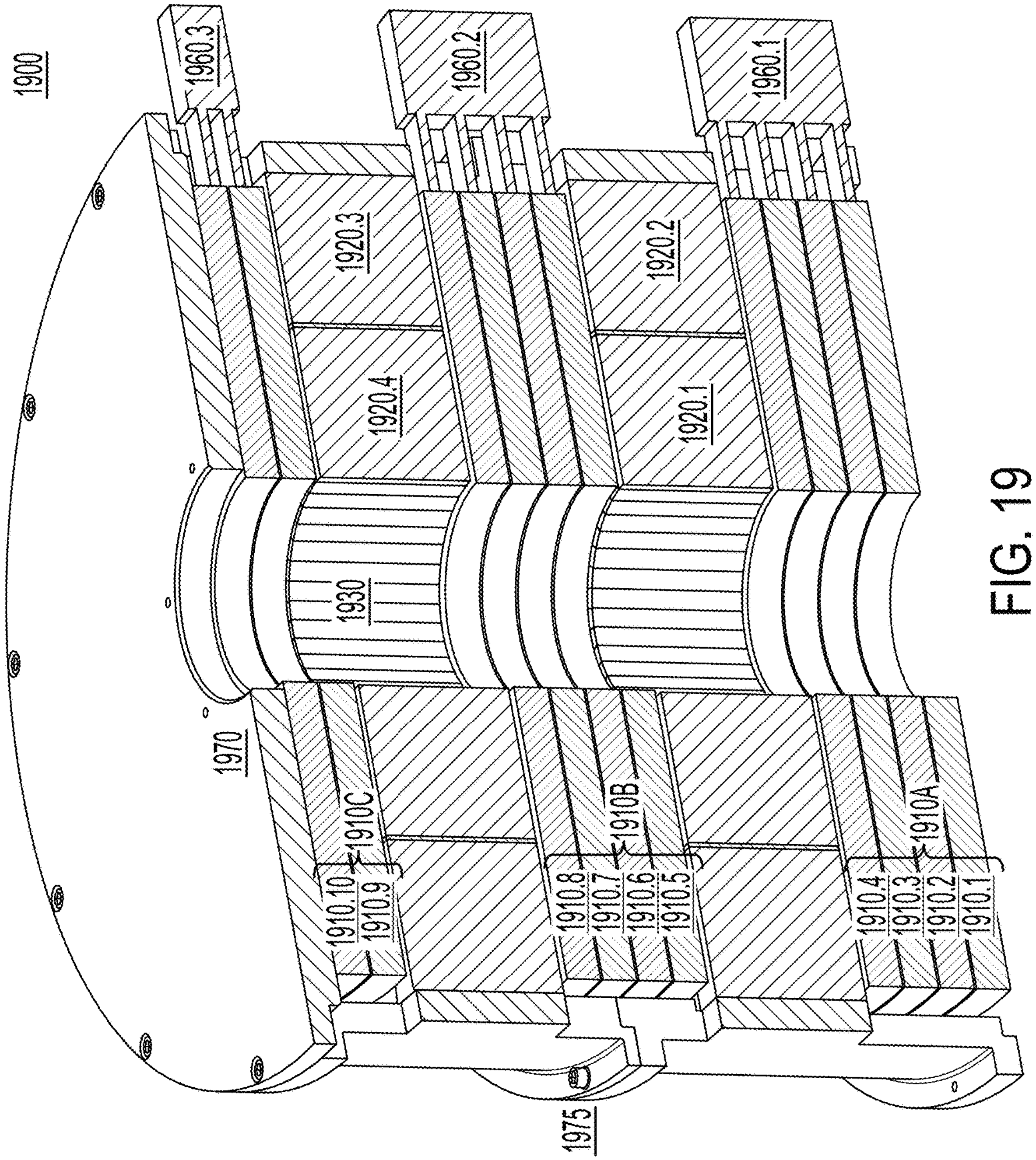
FIG. 19 illustrates a cross-sectional view of the electro-permanent magnet assembly according to the fifth example embodiment of the present invention.

FIG. 19 illustrates a cross-sectional view of the EPM assembly 1900 according to the fifth example embodiment of the present invention.

As illustrated in each of FIG. 19, the EPM assembly 1900 includes a plurality of coils 1910.1-1910.10, the plurality of coils 1910.1-1910.10 being arranged in plural sets of coils 1910A, 1910B, and 1910C. As further illustrated in FIG. 19, the EPM assembly 1900 comprises an array of permanent magnet (PM) rings 1920.1-1920.4. PM Rings 1920.1-1920.4 and plurality of coils 1910.1-1910.10 being enclosed in casing 1970.

The plurality of coils 1910.1-1910.10 are electro-magnet coils (e.g., a toroid, loop, helix, or spiral) and may be constructed of a copper coil or other conductive material (e.g., aluminum, silver, gold, etc.) and/or may be tape wound. One or more cooling plates are disposed between the plurality of coils 1910.1-1910.10. Cooling liquid may be supplied to the cooling plates using one or more cooling manifolds. For example, cooling manifolds 1960.1, 1960.2, and 1960.3 may be coupled to each set of coils 1910A, 1910B, 1910C, respectively.

Each of the PM rings 1920.1-1920.4 may be constructed with a plurality of arc segment blocks. Permanent magnets may include high energy product, rare earth magnet materials such as Samarium Cobalt and/or Neodymium Iron Boron alloys. Each of the PM rings 1920.1-1920.4, or segments thereof, may be magnetized using known techniques.

The structural material of casing 1970 may be non-ferromagnetic in this embodiment. Alternatively, a ferromagnetic casing or band on the outer diameter may be used to modify the magnetic fields and/or provide shielding of the external magnetic fields. Casing 1970 may be structurally enforced using a plurality connectors 1975 (e.g., bolts or screws).

Figure 20:
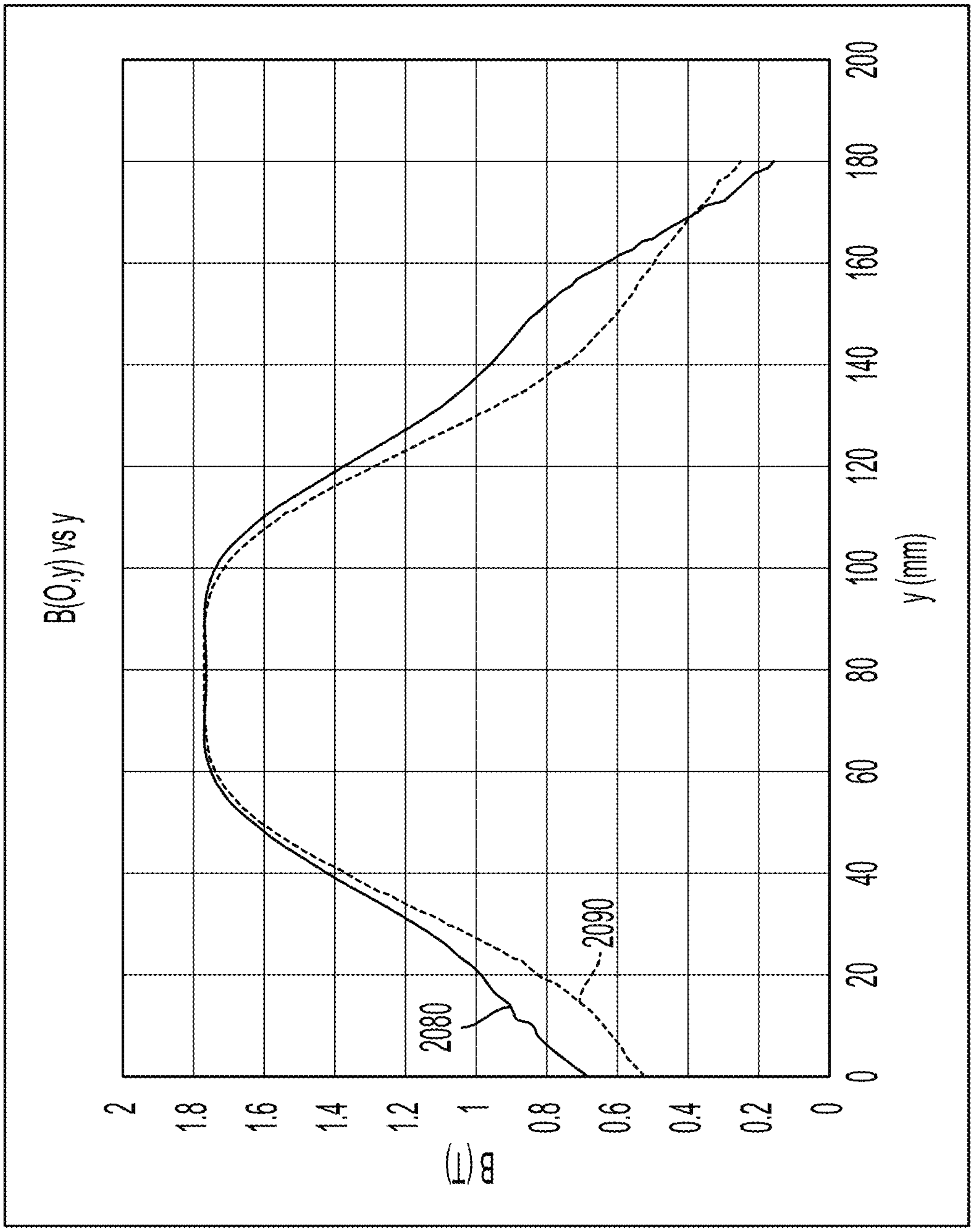
FIG. 20 illustrates a comparison of magnetic characteristics of the electro-permanent magnet assemblies of the first and fifth embodiments.

FIG. 20 illustrates a comparison of magnetic characteristics of the electro-permanent magnet assemblies of the first and fifth embodiments. In particular, FIG. 20 illustrates a comparison axial bore field at the center versus axial position of the first embodiment shown in FIGS. 8-10 and the fifth embodiment shown in FIG. 16. Curve 2090 is for the multi coil, all permanent magnet array embodiment as illustrated by FIGS. 8-10, and curve 2080 is the multi coil and combined permanent magnet ring arrays with ferromagnetic return path as illustrated by FIG. 16.

In the various embodiments described above, the electro-permanent magnets described herein provide a large, uniform, axial magnetic field in the bore region with much lower current and power than may be obtained with only coils. In addition, the example configurations and magnetization of PM rings and the plurality of coils do not require use of ferromagnetic materials. However, configurations with ferromagnetic material may be configured to modify the magnetic fields and/or provide shielding of the external magnetic fields.

Ferromagnetic materials may include low Carbon Iron, Iron Cobalt alloys and/or Nickel Iron alloys. Permanent magnets may include high energy product, rare earth magnet materials such as Samarium Cobalt and/or Neodymium Iron Boron alloys. High conductivity conductor materials may include oxygen free copper, aluminum, silver and gold. Insulating material may include the use of polyimide films such as Kapton® and/or polytetrafluoroethene (PTFE) (Teflon™), rubber and/or fiberglass. Coolants may include water, glycol/water mixtures, mineral and synthetic oils, and/or dielectric fluids including Novec™ and Fluorinert™

The geometries and/or data presented in FIG. 8 through FIG. 20 are for 2" (~50 mm) diameter. For the 2" bore diameter, the outer diameter (OD) of the magnet ring is 8.3" with a height of 1.5".

The electro-magnet coils are presently designed at a 9" OD and height of 0.26" and assembled with 0.08" tall, interleaved, micro-channel, cold plates of the same OD.

The overall assembly height is 7.2 inches, weight is estimated at 150 Lbs. and estimated operating power is between 25-40 KW, depending on operating temperature and duty cycle.

It will be apparent to those skilled in the art that various modifications and variations may be made in the hybrid halbach permanent and electromagnet array for 2$^{nd}$ or other harmonic gyrotrons of the present invention without departing form the spirit or scope of the invention. Thus, it is intended that the present invention cover the modifications and variations of this invention provided they come within the scope of the appended claims and their equivalents.

What is claimed is:

1. A non-cryogenic electro-permanent magnet for use in a gyrotron comprising:

a plurality of toroidal-shaped sets of electromagnet coils;

a plurality of toroidal-shaped permanent magnets, each permanent magnet comprising a plurality of arc segment blocks;

wherein each set of the coils is separated from an adjacent set of the coils by one or more of the permanent magnets disposed between adjacent sets of coils, such that the coils and the permanent magnets are arranged concentrically to form a bore.

2. The non-cryogenic electro-permanent magnet for use in a gyrotron according to claim 1, wherein a combination of first magnetic fields of the permanent magnets and second magnetic fields of the coils generate a substantially uniform axial magnetic field in the bore.

3. The non-cryogenic electro-permanent magnet for use in a gyrotron according to claim 1, wherein one of the permanent magnets surrounds the one or more permanent magnets between adjacent sets of the coils.

4. The non-cryogenic electro-permanent magnet for use in a gyrotron according to claim 1, wherein one of the permanent magnets surrounds a set of the coils.

5. The non-cryogenic electro-permanent magnet for use in a gyrotron according to claim 1, a ferromagnetic band surrounding the permanent magnets.

* * * * *